United States Patent [19]

Anderson et al.

[11] 4,146,698

[45] Mar. 27, 1979

[54] PROCESS FOR THE POLYMERIZATION OF VINYL CHLORIDE IN THE PRESENCE OF CALCIUM & ZINC ACRYLATE

[75] Inventors: Donald F. Anderson, White Plains, N.Y.; Arthur J. Yu, Stamford, Conn.

[73] Assignee: Stauffer Chemical Company, Westport, Conn.

[21] Appl. No.: 839,855

[22] Filed: Oct. 6, 1977

[51] Int. Cl.$^2$ ............... C08F 30/04; C08F 230/04
[52] U.S. Cl. ............... 526/240; 260/23 AR; 260/28.5 D; 526/74; 526/200; 526/214; 526/218; 526/221; 526/230.5; 526/273; 526/317
[58] Field of Search ............... 526/240, 273, 317, 221

[56] References Cited

U.S. PATENT DOCUMENTS

| | | | |
|---|---|---|---|
| 2,147,154 | 2/1939 | Fikentscher | 260/29.6 S |
| 2,562,897 | 8/1951 | Ellingboe | 526/273 |
| 2,585,506 | 2/1952 | Shokal et al. | 260/30.4 |
| 2,589,237 | 3/1952 | Ellingboe | 526/273 |
| 2,604,463 | 7/1952 | Bilton et al. | 526/273 |
| 2,607,754 | 8/1952 | Ellingboe et al. | 526/273 |
| 2,669,549 | 2/1954 | Darby | 260/23 |
| 2,687,405 | 8/1954 | Rothrock et al. | 526/273 |
| 2,993,034 | 7/1961 | Swern | 526/273 |
| 3,065,213 | 11/1962 | Vandenberg | 526/273 |
| 3,294,658 | 12/1966 | Atchison et al. | 526/273 |
| 3,370,731 | 2/1968 | Grommers et al. | 526/273 |
| 3,642,741 | 2/1972 | Baeskai | 526/273 |
| 3,669,946 | 6/1972 | Koyanagi et al. | 526/211 |
| 3,705,137 | 12/1972 | Kuwahara et al. | 526/240 |
| 3,862,066 | 1/1975 | Reiter et al. | 260/23 X A |

FOREIGN PATENT DOCUMENTS

| | | |
|---|---|---|
| 663220 | 10/1935 | Fed. Rep. of Germany. |
| 2032513 | 11/1970 | France ............... 526/240 |
| 38-6391 | 5/1963 | Japan ............... 526/273 |
| 46-21891 | 6/1971 | Japan ............... 526/273 |
| 46-35850 | 10/1971 | Japan ............... 526/273 |
| 595447 | 12/1947 | United Kingdom. |
| 1460221 | 12/1976 | United Kingdom. |

OTHER PUBLICATIONS

Platzer, "Adv. in Chem. Series #85" pp. 72 & 81 ACS.

Primary Examiner—Herbert J. Lilling
Attorney, Agent, or Firm—Richard P. Fennelly

[57] ABSTRACT

Polymerization of vinyl chloride monomer, by either suspension or emulsion polymerization, optionally in the presence of a monoethylenically unsaturated comonomer, is carried out in the presence of a mixture of calcium and zinc acrylate. The presence of the calcium and zinc acrylate yields a more thermally stable product and reduces the amount of polymer scale formation during polymerization. A further improvement in thermal stability is achieved by conducting the polymerization with the added presence of an epoxy compound containing a reactive vinyl or allyl group.

12 Claims, No Drawings

4,146,698

PROCESS FOR THE POLYMERIZATION OF VINYL CHLORIDE IN THE PRESENCE OF CALCIUM & ZINC ACRYLATE

BACKGROUND OF THE INVENTION

1. Field of the Invention

The present invention relates to a process for the polymerization of vinyl chloride monomer, optionally in the presence of a monoethylenically unsaturated comonomer.

2. Description of the Prior Art

A number of prior art references are directed to forming stabilized vinyl chloride polymer compositions. In a number of prior art patents (for example, U.S. Pat. Nos. 2,585,506; 2,669,549; and 2,687,405) stabilizing additives, such as those containing epoxy groups, are merely added to the polymer after the polymerization procedure has terminated. Other investigators have tried to achieve the desired stabilization by conducting the polymerization in the presence of a stabilizing additive. In U.S. Pat. No. 3,862,066 the polymerization was conducted in the presence of a lubricant, a stabilizer (for example, a salt of an organic acid), a pigment and a polymeric modifier. Finally, in British Pat. No. 1,460,221, the polymerization was conducted in the presence of an alkaline earth salt of a carboxylic acid having from 2 to 25 carbon atoms in its molecule followed by the essential step of blending the resultant polymer with a zinc salt of a similar carboxylic acid.

Processes for the polymerization of vinyl chloride with a reduction in the amount of polymer scale formation during the polymerization reaction are known. For example, in U.S. Pat. No. 3,997,707 to S. Argura et al. the presence of oxalic acid or one of its salts is proposed. In U.S. Pat. No. 3,669,946 to S. Koyanagi et al. a polar organic compound, dye or pigment is proposed as a "clean reactor" additive. Significantly, at Col. 3, lines 65–67 of the Koyanagi et al. patent it is taught that carboxylic acids having from one to five carbon atoms are not useful in reducing polymer scale formation.

SUMMARY OF THE PRESENT INVENTION

The present invention is an improved process for polymerizing vinyl chloride monomer, either by suspension or emulsion polymerization, optionally with a ethylenically unsaturated comonomer, in the presence of a mixture of calcium and zinc acrylate to yield a more thermally stable resin product and to reduce the amount of polymer scale formation during the reaction. A further improvement in thermal stability is achieved by the additional presence during the reaction of an epoxy compound containing a reactive vinyl or allyl group.

The calcium and zinc acrylates become copolymerized with the vinyl chloride monomer and, optional comonomers, if present, so as to be chemically bound in the final composition. The additional use of an epoxy compound containing a vinyl or allyl group which can react with the other polymerizable monomers that are present also insures a chemical bonding of these additional stabilizers in the final product.

DESCRIPTION OF THE PREFERRED EMBODIMENTS

The present invention is an improved process for the polymerization of vinyl chloride monomer, either by suspension or emulsion polymerization, optionally with a monoethylenically unsaturated comonomer.

The suspension polymerization process to which the present improvement is applicable is well known in the art. The reaction mixture in such a polymerization process comprises water and from about 25% to about 45%, by weight of said mixture, of a vinyl chloride monomer charge. Such a charge comprises vinyl chloride monomer, either alone or with up to about 50%, by weight of the monomers, of any of the well-recognized monomers which copolymerize with vinyl chloride monomer. Examples are such monoethylenically unsaturated monomers as the aliphatic acid vinyl esters, e.g., vinyl acetate, the vinylidene halides, e.g., vinylidene chloride, the alkyl acrylates, e.g., ethyl or methyl arcylate, the alkyl methacrylates, e.g., methyl methacrylate, dialkyl vinylphosphonates, e.g., bis(beta-chloroethyl)-vinylphosphonate, acrylonitrile and the like. The suspension polymerization medium also contains about 0.01% to about 5%, preferably about 0.05% to about 1%, by weight of the monomers, of a suspending agent and about 0.01% to about 3%, preferably about 0.2 to about 1%, by weight of the monomers, of a monomer soluble initiator. Examples of suitable suspending agents are methyl cellulose, hydroxyethyl cellulose, hydroxypropyl cellulose, hydroxypropyl methyl cellulose, carboxymethyl cellulose, talc, clay, polyvinyl alcohol, gelatine and the like. Examples of suitable initiators are azobisisobutyronitrile, lauroyl peroxide, benzoyl peroxide, isopropylperoxy dicarbonate, and the like. Polymerization is conducted by heating the above-described reaction medium at an effective temperature, e.g., from about 30° C. to 85° C., for an effective period of time, e.g., from about 2 to 12 hours, with agitation being applied throughout the course of the reaction, in order to polymerize the monomers. If desired, more than one temperature can be used to polymerize the monomers.

The type of emulsion polymerization which can be used to affect polymerization of the monomers is also well known to persons of ordinary skill in the art. It is similar to the suspension polymerization procedure described above with the exception that the suspending agent is replaced with an emulsifier and the monomer soluble catalyst is replaced with a water soluble or redox catalyst. Representative emulsifiers include the alkyl carboxylic acid salts, the alkyl sulfate, phosphate, or sulfosuccinate salts, the alkyl aryl ether alcohols, and the alkyl aryl polyether sulfate salts. Representative water soluble initiators include sodium, potassium and ammonium persulfate and hydrogen peroxide. Representative redox catalysts include a mixture of an alkali metal persulfate with an alkali metal bisulfite, thiosulfate or hydrosulfite.

The benefits of the present invention are secured by conducting the above described suspension or emulsion polymerization in the presence of an effective amount of a mixture of the calcium and zinc acrylates to both yield a more thermally stable resin and to reduce the polymer scale formation during the reaction. The amount of said mixture can generally range from about 0.1% to about 10%, preferably from about 0.5% to about 3%, by weight of the monomer or monomers which are to be polymerized. The weight ratio of the calcium acrylate to zinc acrylate should be in molar ratios which are effective to give the desired degree of thermal stability and reduce the formation of polymer scale. Generally these molar ratios can range from about 4:1 to about 1:4, with ratios of from about 1:1 to about 3:1 being preferred as giving thermal stability for the longest periods of time. The calcium/zinc acrylate mixture can be incorporated in the reaction medium by either adding the appropriate amounts of calcium and zinc acrylate or by generating them in situ by the reaction of appropriate stoichiometric quantities of acrylic acid, calcium oxide and zinc oxide. The latter procedure is often preferred since it is more economically attractive.

In order to achieve a further improvement in thermal stability of the resins which are produced by the process of the present invention, the polymerization may be conducted in the additional presence of an effective amount of an epoxy compound containing a reactive vinyl or allyl group for reaction with the monomers to be polymerized. Generally, the amount of said epoxy compound which is used will range from about 0.1% to about 10%, preferably from about 0.5% to about 3%, by weight of the vinyl chloride monomer or mixture of the vinyl chloride monomer and comonomer(s). Epoxy compounds of the following formula are meant to be included:

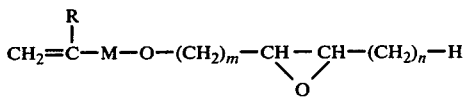

where R is H or $CH_3$, M is $CH_2$ or $C(O)$, and m and n are independently from 0 to 10. Preferably m and n range from 0 to 4, for example, m is 1 and n is O. Representative epoxy compounds containing reactive vinyl or allyl groups include glycidyl acrylate (R = H; M = C(O); m = 1; and n = O) glycidyl methacrylate (R = $CH_3$; M = C(O); m = 1; n = O) and allyl glycidyl ether (R = H; M = $CH_2$; m = 1; n = O) due to their ready commercial availability.

The present invention is further illustrated by the following Examples which show certain preferred embodiments thereof.

The following ingredients and reaction conditions were used (all amounts are given in grams):

| Ingredient | Amount | | |
|---|---|---|---|
| | 1 | 2 | 3 |
| Deionized water | 4460 | 4460 | 4460 |
| Vinyl chloride monomer* | 2205 | 2077 | 2091 |
| Vinyl acetate monomer | 465 | 465 | 465 |
| Trichloroethylene chain transfer agent | 11.1 | 11.1 | 11.1 |
| Azobisisobutyronitrile initiator | 4.5 | 4.5 | 4.5 |
| Hydroxyethyl cellulose suspending agent (1 wt. % solution) | 58.12 | 58.12 | 58.12 |
| Methyl cellulose suspending agent (0.1 wt. % solution) | 5.22 | 5.22 | 5.22 |
| Sodium carbonate buffer | 4.0 | 4.0 | 4.0 |
| Sodium bicarbonate buffer | 5.76 | 5.76 | 5.76 |
| Conditions | | | |
| Temp (° C.) | 65 | 65 | 65 |
| Agitator Rotation (r.p.m.) | 500 | 500 | 500 |
| pH of Aqueous Phase (end of run) | 5.4 | 5.5 | 5.5 |
| Reaction Time (hrs.) | 3.3 | 5.6 | 3.1 |

*In Examples 1–3, as well as Examples 4–12 which follow, the vinyl chloride monomer was metered into the reactor as a liquid as accurately as possible. The vinyl chloride supply tank was positioned on a scale.

After the third run there was a thick buildup of polymer scale in the reactor requiring a solvent washing with a mixture of tetrahydrofuran and acetone.

EXAMPLES 4–8

These Examples illustrate a sequence of five suspension polymerization reactions wherein a mixture of zinc and calcium acrylate was added to the polymerization medium to improve reactor cleanliness. The first reaction (Example 4) was carried out in a clean reactor, whereas the next four were carried out in the same reactor without solvent cleaning after removal of the polymer latex. The series was terminated when the level of polymer buildup was visually judged to be equivalent to the buildup after control Example 3. The Table which follows sets forth the results with all amounts being in grams.

| Ingredients | AMOUNTS | | | | |
|---|---|---|---|---|---|
| | 4 | 5 | 6 | 7 | 8 |
| Deionized water | 4460 | 4460 | 4460 | 4460 | 4460 |
| Vinyl chloride monomer | 2040 | 2150 | 2110 | 2105 | 2055 |
| Vinyl acetate monomer | 465 | 465 | 465 | 465 | 465 |
| Trichloroetylene chain transfer agent | 11.1 | 11.1 | 11.1 | 11.1 | 11.1 |
| Azobisisobutyronitrile initiator | 4.5 | 4.5 | 4.5 | 4.5 | 4.5 |
| Hydroxyethyl cellulose suspending agent (1 wt % solution) | 58.12 | 58.12 | 58.12 | 58.12 | 58.12 |
| Methyl cellulose suspending agent (0.1 wt % solution) | 5.22 | 5.22 | 5.22 | 5.22 | 5.22 |
| Sodium bicarbonate buffer | 5.76 | 5.76 | 5.76 | 5.76 | 5.76 |
| Sodium carbonate buffer | 4.00 | 4.00 | 4.00 | 4.00 | 4.00 |
| Sodium nitrite (1 wt % solution)* | 24.0 | 24.0 | 24.0 | 24.0 | 24.0 |
| Aluminum sulfate* | 2.5 | 2.5 | 2.5 | 2.5 | 2.5 |
| Zinc acrylate | 10.0 | 10.0 | 10.0 | 10.0 | 10.0 |
| Calcium acrylate | 18.0 | 18.0 | 18.0 | 18.0 | 18.0 |
| Conditions | | | | | |
| Temp. (° C.) | 65 | 65 | 65 | 65 | 65 |
| Agitator Rotation (r.p.m.) | 500 | 500 | 500 | 500 | 500 |
| pH of Aqueous Phase (end of run) | 7.4 | 7.6 | 7.6 | 7.6 | 7.6 |
| Reaction time (hrs.) | 5.3 | 3.8 | 4.6 | 4.4 | 3.6 |

*these additives have been found to exert no beneficial results on reactor cleanliness.

EXAMPLES 1–3

These control Examples illustrate a sequence of three consecutive suspension polymerization reactions wherein the zinc and calcium acrylate mixture of the present invention was not used. The first reaction (Example 1) was carried out in a clean reactor, equipped with stirrer, whereas the next two were carried out sequentially in the same reactor without any intermediate solvent cleaning after removal of the polymer latex.

EXAMPLES 9–12

These Examples illustrate a sequence of four suspension polymerization reactions wherein a mixture of zinc oxide, calcium oxide and acrylic acid were added to the polymerization medium to generate calcium and zinc acrylate in situ to improve reactor cleanliness. The first reaction (Example 9) was carried out in a clean reactor, whereas the next three were carried out in the same reactor without solvent cleaning after removal of the polymer latex. This series of reactions was also terminated when it was visually determined that the buildup of polymer scale was equivalent to the buildup after control Example 3.

| | AMOUNTS | | | |
|---|---|---|---|---|
| Ingredients | 9 | 10 | 11 | 12 |
| Deionized water | 4460 | 4460 | 4460 | 4460 |
| Vinyl chloride monomer | 2065 | 2060 | 2230 | 2040 |
| Vinyl acetate monomer | 465 | 465 | 465 | 465 |
| Azobisisobutyronitrile initiator | 4.5 | 4.5 | 4.5 | 4.5 |
| Butyl thiglycolate chain transfer agent | 9.0 | 9.0 | 9.0 | 9.0 |
| Hydroxyethyl cellulose suspending agent (1 wt. % solution) | 58.12 | 58.12 | 58.12 | 58.12 |
| Methyl cellulose suspending agent (0.1 wt. % solution) | 5.22 | 5.22 | 5.22 | 5.22 |
| Sodium bicarbonate buffer | 5.8 | 5.8 | 5.8 | 5.8 |
| Sodium carbonate buffer | 4.0 | 4.0 | 4.0 | 4.0 |
| Calcium oxide | 0.6 | 0.6 | 0.6 | 0.6 |
| Zinc oxide | 0.41 | 0.41 | 0.41 | 0.41 |
| Acrylic acid | 2.8 | 2.8 | 2.8 | 2.8 |
| Conditions | | | | |
| Temp. (° C) | 65 | 65 | 65 | 65 |
| Agitator Rotation (r.p.m.) | 500 | 500 | 500 | 500 |
| pH of Aqueous Phase (end of run) | 5.4 | 5.2 | 5.2 | 5.2 |
| Reaction time (hrs.) | 4.7 | 4.8 | 4.9 | 5.1 |

EXAMPLES 13-17

In these Examples a series of polymerizations were run with addition of a calcium/zinc acrylate mixture, optionally in the presence of glycidyl acrylate, and the thermal stability of the resins was tested. The Table which follows sets forth the ingredients which were used (in grams):

| | AMOUNTS | | | | |
|---|---|---|---|---|---|
| Ingredients | 13 | 14 | 15 | 16 | 17 |
| Vinyl chloride monomer* | 150 | 150 | 150 | 150 | 150 |
| Ca/Zn Acrylate Solution** | — | 76 | — | 76 | 50 |
| Glycidyl acrylate | — | — | 1.0 | 1.0 | 0.5 |
| Methyl cellulose suspending agent (1 wt. % solution) | 20 | 20 | 20 | 20 | 20 |
| 2-ethylhexyl peroxydicarbonate initiator | 0.6 | 0.6 | 0.6 | 0.6 | 0.6 |
| Denionized water | 270 | 194 | 269 | 193 | 220 |

*In this set of experiments the relatively small amount of vinyl chloride monomer that was used allowed for more accurate weighing of the monomer (in a suitable container) on a laboratory scale than was possible for the relatively larger amounts used in Examples 1-12.
**formed by mixing 13 gm. acrylic acid, 1.6 gm. zinc oxide, 2.8 gm. calcium and 982.6 gm. water.

The product from each of Examples 13-17 was mixed with various lubricants, stabilizers and process aids, as shown in the following Table and the heat stability of the resulting formulation was determined on a 2 roll mill having a front roll at 182.2° C. and rear roll at 176.7° C. The time (in minutes) for the clear formulation to change to dark amber is given in the Table with longer times being desirable. All amounts are given in parts by weight.

| | AMOUNTS | | | | |
|---|---|---|---|---|---|
| Ingredients | 13 | 14 | 15 | 16 | 17 |
| Vinyl chloride polymer | 100 | 100 | 100 | 100 | 100 |
| Acrylic process aid ("Acryloid 120 N" from Rohm and Haas) | 3.2 | 3.2 | 3.2 | 3.2 | 3.2 |
| Calcium stearate lubricant | 1.6 | 1.6 | 1.6 | 1.6 | 1.6 |
| Carnauba wax lubricant ("Wax E" from Hoechst) | 0.6 | 0.6 | 0.6 | 0.6 | 0.6 |
| Heat Stability (in min.): | 0.5 | 6 | 0.25 | 9 | 8 |

The data on the previous Table show that a control resin (Example 13) degrades in 0.5 minutes, whereas one made in accordance with the present invention using the calcium/zinc acrylate additive as an ingredient in the polymerization reaction does not degrade until 6 minutes have elapsed. The additional presence of glycidyl acrylate during the polymerization reaction (Examples 16 and 17) surprisingly improves thermal stability of the resin even though use of glycidyl acrylate alone (Example 15) during the polymerization detracts from resin stability.

The foregoing Examples illustrate certain preferred embodiments of the invention and should not be construed in a limiting sense. The scope of protection which is desired is set forth in the claims which follow.

We claim:

1. An improved process for polymerizing vinyl chloride, optionally in the presence of up to about 50%, by weight, of a monoethylenically unsaturated comonomer by suspension or emulsion polymerization, in an aqueous reaction medium containing up to about 45%, by weight, monomer wherein the improvement comprises conducting the polymerization in the presence of an effective amount of a mixture of calcium and zinc acrylate to improve the thermal stability of the product and to reduce the production of polymer scale, said amount of the mixture being up to about 10%, by weight of the monomer or monomers which are polymerized.

2. A process as claimed in claim 1 wherein the calcium and zinc acrylates are present at about 0.1% to about 10%, by weight of the vinyl chloride or vinyl chloride and comonomer.

3. A process as claimed in claim 1 wherein the molar ratio of calcium acrylate to zinc acrylate ranges from about 4:1 about 3:1.

4. A process as claimed in claim 2 wherein the molar ratio of calcium acrylate to zinc acrylate ranges from about 1:1 to about 3:1.

5. A process as claimed in claim 1 which further comprises the presence of an effective amount of an epoxy compound containing a reactive vinyl or allyl group to further improve the thermal stability of the product.

6. A process as claimed in claim 5 wherein the epoxy compound is present at about 0.1% to about 10%, by weight of the vinyl chloride or vinyl chloride and comonomer.

7. A process as claimed in claim 5 wherein the epoxy compound is represented by the formula:

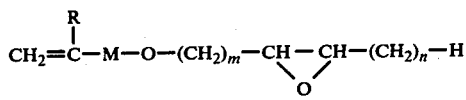

wherein R is either H or CH$_3$, M is either CH$_2$ or C(O), and m and n can range from 0 to 10.

8. A process as claimed in claim 5 wherein the epoxy compound is selected from the group consisting of glycidyl acrylate, glycidyl methacrylate and allyl glycidyl ether.

9. A process as claimed in claim 4 which comprises the further step of conducting the polymerization in the presence of an effective amount of an epoxy compound containing a reactive vinyl or allyl group to further improve the thermal stability of the product.

10. A process as claimed in claim 9 wherein the epoxy compound is present at about 0.5% to about 3%, by weight of the vinyl chloride or vinyl chloride and comonomer.

11. A process as claimed in claim 9 wherein the epoxy compound is represented by the formula:

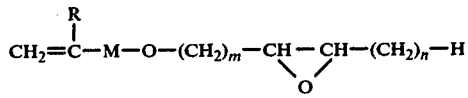

wherein R is either H or CH$_3$, M is either CH$_2$ or C(O), and m and n can range from 0 to 4.

12. A process as claimed in claim 9 wherein the epoxy compound is selected from the group consisting of glycidyl acrylate, glycidyl methacrylate and allyl glycidyl ether.

* * * * *

UNITED STATES PATENT AND TRADEMARK OFFICE
CERTIFICATE OF CORRECTION

PATENT NO. : 4,146,698

DATED : March 27, 1979

INVENTOR(S) : Donald F. Anderson et al.

It is certified that error appears in the above-identified patent and that said Letters Patent are hereby corrected as shown below:

Front Page, under the heading "References Cited", U.S. Patent No. "3,370,731" should read -- 3,370,031 --;

Col. 2, lines 13-14, "arcylate" should be -- acrylate --;

Cols. 3-4, in the Table for Examples 4-8, 4th line, Trichloroetylene" should be -- Trichloroethylene --;

Cols. 5-6, in the Table for Examples 9-12, 5th line, "thiglycolate" should be -- thioglycolate --;

Cols. 5-6, in the Table for Examples 13-17, in the footnote **, "calcium" should be --calcium oxide --; and Col. 7, Claim 3, line 2, -- to -- should be inserted before "about 3:1.".

Signed and Sealed this

Eleventh Day of September 1979

[SEAL]

Attest:

LUTRELLE F. PARKER

Attesting Officer    Acting Commissioner of Patents and Trademarks